United States Patent
Lembersky et al.

(10) Patent No.: US 9,947,320 B2
(45) Date of Patent: *Apr. 17, 2018

(54) SCRIPT COMPLIANCE IN SPOKEN DOCUMENTS BASED ON NUMBER OF WORDS BETWEEN KEY TERMS

(71) Applicant: NICE-SYSTEMS LTD, Ra'anana (IL)

(72) Inventors: Gennadi Lembersky, Nesher (IL); Maor Nissan, Herzeliya (IL); Ronny Bretter, Kiriyat Motzkin (IL)

( * ) Notice: Subject to any disclaimer, the term of this patent is extended or adjusted under 35 U.S.C. 154(b) by 544 days.

This patent is subject to a terminal disclaimer.

(21) Appl. No.: 14/538,833

(22) Filed: Nov. 12, 2014

(65) Prior Publication Data

US 2016/0133256 A1    May 12, 2016

(51) Int. Cl.
| | | |
|---|---|---|
| G10L 21/00 | (2013.01) |
| G10L 15/00 | (2013.01) |
| G10L 15/26 | (2006.01) |
| G06Q 10/06 | (2012.01) |
| G10L 25/48 | (2013.01) |
| G10L 15/18 | (2013.01) |
| G10L 15/197 | (2013.01) |
| G10L 15/08 | (2006.01) |
| H04M 3/42 | (2006.01) |
| H04M 3/51 | (2006.01) |

(52) U.S. Cl.
CPC ........ G10L 15/26 (2013.01); G06Q 10/06398 (2013.01); G10L 25/48 (2013.01); G10L 15/1815 (2013.01); G10L 15/197 (2013.01); G10L 2015/088 (2013.01); H04M 3/42221 (2013.01); H04M 3/5175 (2013.01)

(58) Field of Classification Search
CPC ... G10L 15/26; G10L 15/197; G10L 15/1815; H04M 3/5175
USPC .......................................... 704/270, 257, 235
See application file for complete search history.

(56) References Cited

U.S. PATENT DOCUMENTS

| | | | | |
|---|---|---|---|---|
| 7,966,187 B1 * | 6/2011 | Pettay | ..................... | G10L 15/26 704/270 |
| 8,447,608 B1 * | 5/2013 | Chang | ................... | G10L 15/197 704/257 |

(Continued)

OTHER PUBLICATIONS

Igor Szoke. (2010). "Hybrid word-subword spoken term detection". BRNO University of Technology Department of Computer Graphics and Multimedia.

(Continued)

*Primary Examiner* — Farzad Kazeminezhad
(74) *Attorney, Agent, or Firm* — Soroker Agmon Nordman

(57) ABSTRACT

A method, computerized apparatus and computer program product for determining script compliance in interactions, the method comprising: receiving one or more indexed audio interaction; receiving a text representing a script; automatically extracting two or more key terms from the script; automatically generating a query representing the script, comprising: receiving one or more constraint associated with the at least two key terms; and determining spotted key terms of the key terms that appear in the indexed audio interactions; determining complied constraints based on a number of words difference between two key terms of the at least two key terms; and determining a relevance score for each of the indexed audio interactions, based on the spotted key terms and the complied constraints.

20 Claims, 6 Drawing Sheets

(56) References Cited

U.S. PATENT DOCUMENTS 9,503,579 B2 * 11/2016 Watson .............. H04M 3/5175
2010/0145694 A1 * 6/2010 Ju ...................... G10L 15/1815
                                                                                                         704/235
2015/0348565 A1 * 12/2015 Rhoten ............. G06F 17/30401
                                                                                                          704/270.1

OTHER PUBLICATIONS

Mamou, J., Carmel, D. and Hoory, R. Spoken Document Retrieval from Call-Center Conversations. IBM Haifa Research Labs.
Mamou, J. and Ramabhadran, B. Phonetic Query Expansion for Spoken Document Retrieval.
Chelba, C., Hazen, T. J. and Saraclar, M. (2007). Retrieval and Browsing of Spoken Content. IEEE Signal Magazine Processing.

* cited by examiner

SCRIPT COMPLIANCE IN SPOKEN DOCUMENTS BASED ON NUMBER OF WORDS BETWEEN KEY TERMS

TECHNICAL FIELD

The present disclosure relates to speech processing in general, and to determining whether interactions comply with scripts, in particular.

BACKGROUND

Large organizations, such as commercial organizations, financial organizations or public safety organizations conduct numerous audio and textual interactions with customers, users, suppliers or other persons on a daily basis. Some of these interactions are vocal such as telephone conversations, or at least comprise a vocal component, such as an audio part of a video or face-to-face interaction.

Many organizations record some or all of the interactions, whether this is required by law or regulations, for business intelligence, dispute resolution, quality assurance, quality management purposes, or for any other reason.

In many situations, an agent is required to repeat a predetermined script at the appropriate circumstances. For example, upon a user calling a call center and requesting to perform a certain action that involves a fee, the handling agent may be required to repeat the following script: "There is a fee of $50 to process your request, do you authorize this fee?" in order to make sure that the payment is authorized.

As part of agent training or quality control, it may be required to verify that the agent indeed repeated all necessary scripts accurately, or identify interactions in which the agent failed to do so.

Known methods for script compliance determination include manually listening to audio conversations, which is highly labor intensive and impractical for significant call volumes.

In some embodiments, one or a few predetermined words may be detected in an audio signal. However, the detected words may not constitute a full script to be verified, or may be found at dispersed locations, thus not providing a good solution either. Searching for the full script, however, is highly likely to fail due to detection errors, background noises, insignificant errors of the agent, or other problems.

BRIEF SUMMARY

One exemplary embodiment of the disclosed subject matter is a computer-implemented method comprising: receiving one or more indexed audio interactions; receiving a text representing a script; automatically extracting two or more key terms from the script; automatically generating a query representing the script, comprising: receiving one or more constraints associated with the key terms; and determining spotted key terms of the key terms that appear in the indexed audio interactions; determining complied constraints; and determining a relevance score for each of the indexed audio interactions, based on the spotted key terms and the complied constraints. Within the method, the constraints optionally refer to order and distance between two key terms in the indexed audio interaction, wherein the distance relates to time difference or number of words difference between the two key terms. Within the method, the indexed audio interactions optionally comprise a multiplicity of indexed audio interactions, and further comprising filtering indexed audio interactions based on the relevance score. The method may further comprise: sorting the multiplicity of indexed audio interactions based on the relevance score, and filtering from the multiplicity of indexed audio interactions those interactions having the highest or lowest relevance scores. Within the method, the query optionally comprises a weight associated with one or more of the two key terms. Within the method, determining the relevant score optionally comprises: determining one or more groups of key terms, wherein a key term in a group appears in the interaction, and the key term is connected to another key term in the group if the key term and the other key term appear in one constraint complied with by the interaction; determining a score for each group as a function of weights associated with key terms that belong to the group; and determining the relevance score as a maximal relevance score associated with any of the groups. Within the method, extracting the two key terms optionally comprises: discarding irrelevant terms; determining a recognizability score for a word in the script; determining a uniqueness score for the word in the script; combining the recognizability score and the uniqueness score to a word score; and determining that the word is a key term, subject to the word score exceeding a threshold. Within the method, the uniqueness score is optionally determined using a Term Frequency-Inverse Document Frequency (TF-IDF) algorithm. Within the method, extracting the two key terms optionally comprises: discarding irrelevant terms; determining a recognizability score for a word in the script; determining a uniqueness score for the word in the script; and determining that the word is a key term, subject to the recognizability core exceeding a first threshold, or the uniqueness score exceeding a second threshold. The method may further comprise: receiving an audio interaction; decoding speech within the audio interaction; and indexing the decoded speech to obtain the indexed audio interaction.

Another exemplary embodiment of the disclosed subject matter is a computerized apparatus having a processor, the processor being adapted to perform the steps of: receiving an indexed audio interaction; receiving a text representing a script; automatically extracting two or more key terms from the script; automatically generating a query representing the script, comprising: receiving one or more constraints associated with the two or more key terms; and determining spotted key terms of the two or more key terms that appear in the indexed audio interaction; determining complied constraints of the constraint; and determining a relevance score for the indexed audio interaction, based on the spotted key terms and the complied constraints. Within the computerized apparatus, each constraint optionally refers to order and distance between two key terms in the indexed audio interaction, wherein the distance relates to time difference or number of words difference between the two key terms. Within the computerized apparatus, the indexed audio interaction optionally comprises a multiplicity of indexed audio interactions, and further comprising filtering indexed audio interactions based on the relevance score. Within the computerized apparatus, the processor is optionally further adapted to perform the steps of: sorting the multiplicity of indexed audio interactions based on the relevance score, and filtering from the multiplicity of indexed audio interactions those interactions having the highest or lowest relevance scores. Within the computerized apparatus, the relevance score is optionally determined by: determining one or more groups of key terms, wherein a key term in a group appears in the interaction, and the key term is connected to another key term in the group if the key term and the other key term appear in one constraint complied with by the interaction;

determining a score for the group as a function of weights associated with key terms that belong to the group; and determining the relevance score as a maximal relevance score associated with any of the groups. Within the computerized apparatus, extracting the key terms optionally comprises: discarding irrelevant terms; determining a recognizability score for a word in the script; determining a uniqueness score for the word in the script; combining the recognizability score and the uniqueness score into a word score; and determining that the word is a key term, subject to the word score exceeding a threshold. Within the computerized apparatus, extracting the key terms optionally comprises: discarding irrelevant terms; determining a recognizability score for a word in the script; determining a uniqueness score for the word in the script; and determining that the word is a key term, subject to the recognizability score exceeding a first threshold, or the uniqueness score exceeding a second threshold. Within the computerized apparatus, the processor is optionally further adapted to perform the steps of: receiving the audio interaction; decoding speech within the audio interaction; and indexing the decoded speech to obtain the indexed audio interaction. Within the computerized apparatus, the processor is optionally further adapted to perform the steps of: receiving a multiplicity of audio interactions; decoding speech within each of the multiplicity of audio interactions; indexing the decoded speech to obtain indexed audio interactions; repeating the discarding, determining the recognizability score, determining the uniqueness score, combining, and determining whether the word is a key term for each indexed audio interaction; and filtering indexed audio interactions for which the score is above or below a predetermined value.

Yet another exemplary embodiment of the disclosed subject matter is a computer program product comprising a computer readable storage medium retaining program instructions, which program instructions when read by a processor, cause the processor to perform a method comprising: receiving one or more indexed audio interaction; receiving a text representing a script; automatically extracting two or more key terms from the script; automatically generating a query representing the script, comprising: receiving one or more constraints associated with the key terms; and determining spotted key terms of the key terms that appear in the at least one indexed audio interaction; determining complied constraints of the at least one constraint; and determining a relevance score for the indexed audio interaction, based on the spotted key terms and the complied constraints.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

Figure 5:
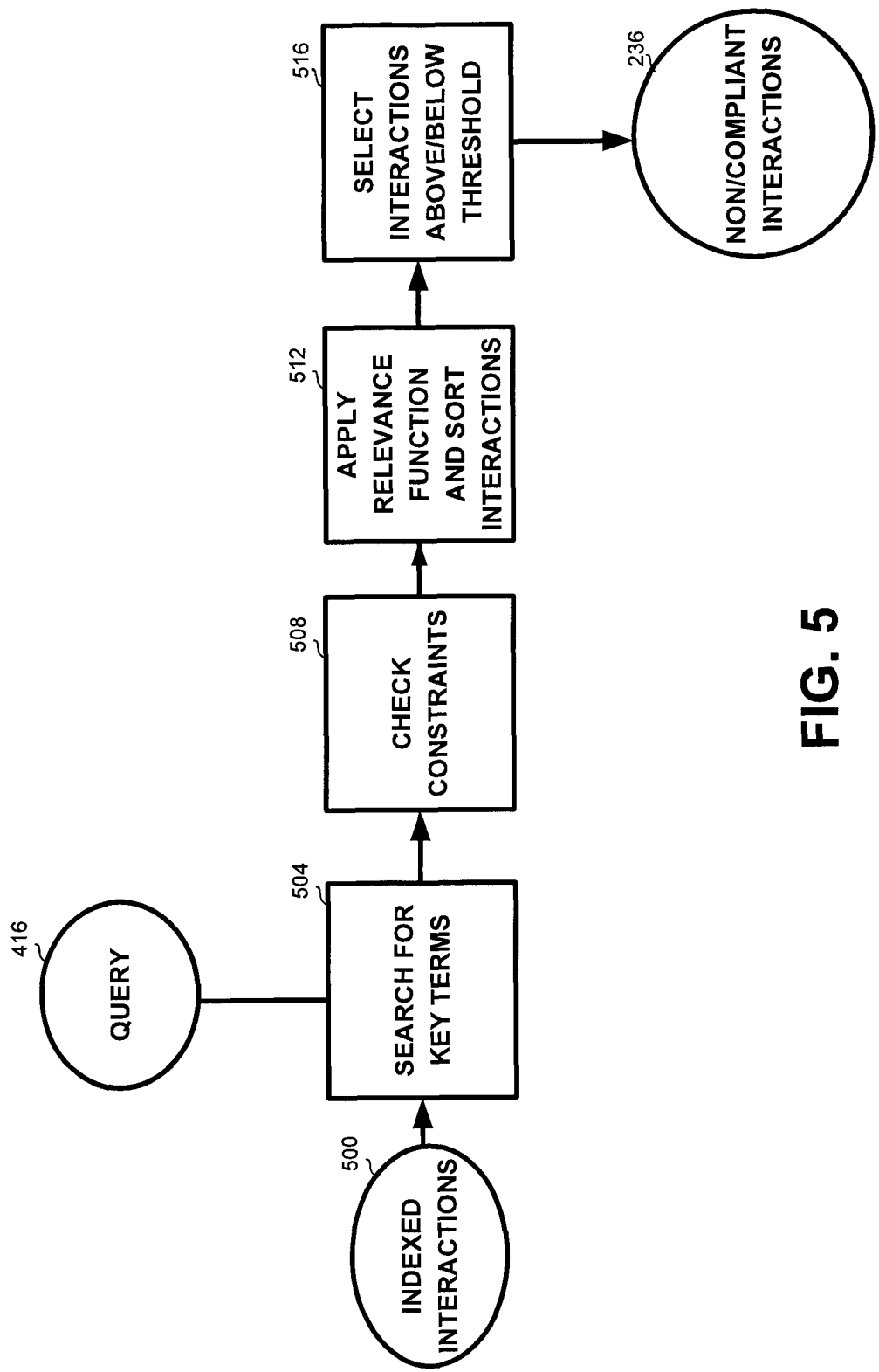
Figure 6:
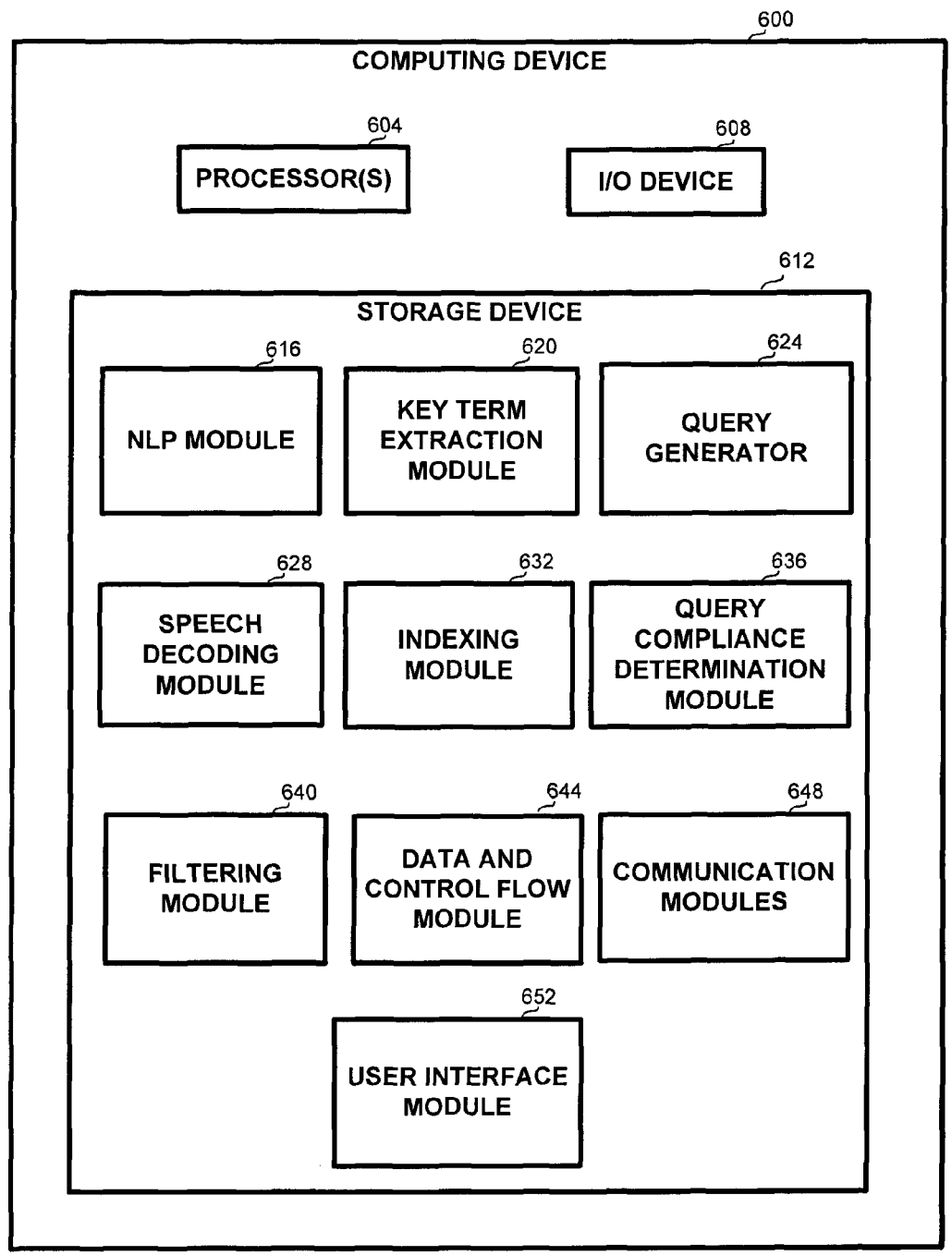

FIG. 5 shows steps in a flowchart of a method for retrieving interactions complying or not complying with a query, in accordance with some exemplary embodiments of the disclosed subject matter; and FIG. 6 is a block diagram of the components in a system for identifying interactions complying or not complying with a query, in accordance with some exemplary embodiments of the disclosed subject matter.

DETAILED DESCRIPTION

In the context of the present disclosure, without limiting, an interaction implies an interaction including an audio component, such as a telephone call between parties, without precluding other media such as text, video and/or imaging. For example, an interaction ensuing from a telephonic call, possibly with intervening transmission of computer screenshots and/or text, or, for example, a recorded walk-in session, a video conference possibly with intervening text, or, for example, a computerized chat possibly with intervening images. An interaction may occur between two or more parties with possible intervening transfers, but may also be one-sided, for example a person leaving a message.

An interaction may be split to a plurality of interactions or sub-interactions, for example, audio data respective to any participating party, or, for example, audio data and imaging data. Unless specifically stated, for brevity, referring to an interaction implies also the sub-interactions.

In the context of the present disclosure, without limiting, the term CTI implies any device and/or apparatus for computer telephony and/or communications integration as known in the art or a custom apparatus for that effect, wherein telephony and/or communications imply any communication technique or technology such as PSTN and/or VoIP and/or cellular communication and/or wireless communication such as Wi-Fi.

Generally, in the context of the present disclosure, without limiting, a language model is any construct reflecting probabilities of sequences of words in a language. A language model may be applied during speech recognition to generate transcriptions from audio data.

Without limiting, a language model is a statistical language model where words or textual terms are assigned probability of occurrence, or weights, by means of a probability distribution. Such a model is referred to herein, representing any language model such as known in the art.

In the context of the present disclosure, without limiting, a script implies a textual construct comprising a word or a sequence of words such as one or more sentences or parts thereof. Alternatively, a script may be provided as an audio segment from which a sequence of words can be retrieved manually or automatically. In yet another alternative the script may be provided as an image. The image may be manually or processed, for example by Object Character Recognition (OCR) to retrieve a script appearing in the image.

In the context of some embodiments of the present disclosure, reference to text or a textual entity implies one or more words of a language, generally as encoded in a computer file or as any suitable form.

Some of the terms used herein are introduced and denoted later on in the present disclosure. The terms cited above denote also inflections and conjugates thereof.

One technical problem dealt with by the disclosed subject matter is the need to verify automatically and with high certainty, whether or not a predetermined script was said in an audio signal, such as an audio interaction. Such verification may be used in dispute resolution, training new agents handling audio interactions with customers or business partners, quality control of agents or interactions, or checking specific interactions.

One technical solution comprises preparing the audio signals to such analysis, which preparation may include decoding and indexing the interactions into searchable structures of words, phonemes, or other parts of speech.

The solution further comprises preparing the script to be searched for, including Natural Language Processing (NLP) for retrieving the basic form of the script words, extracting key terms from the text, and generating a query that represents the script. The key terms may be extracted based on their recognizability or uniqueness.

The query may relate to scores associated with one or more of the terms, wherein the score may relate to the recognizability or uniqueness of the terms. The query may also relate to constraints such as distances between words, meaning that words that originally appear in some proximity to one another in the original script are also required to be within a predetermined word-distance from one another in the audio interaction.

The query may then be applied to each of the interactions to be verified, by applying the query to the searchable structure generated from the interaction. Depending on the application, interactions in which the script is detected, or interactions in which the script is not detected may be output, for example for further analysis or examination.

One technical effect of utilizing the disclosed subject matter is the provisioning of a method and apparatus for detecting whether a predetermined script, comprising a sequence of words was repeated in an audio interaction. The method and apparatus detect the script with high accuracy, while possibly allowing small mistakes or disturbances. The method and apparatus operate automatically, such that a user is not required to listen to lengthy calls, in which it may not even be known at which part of the interaction the script was said.

Figure 1:
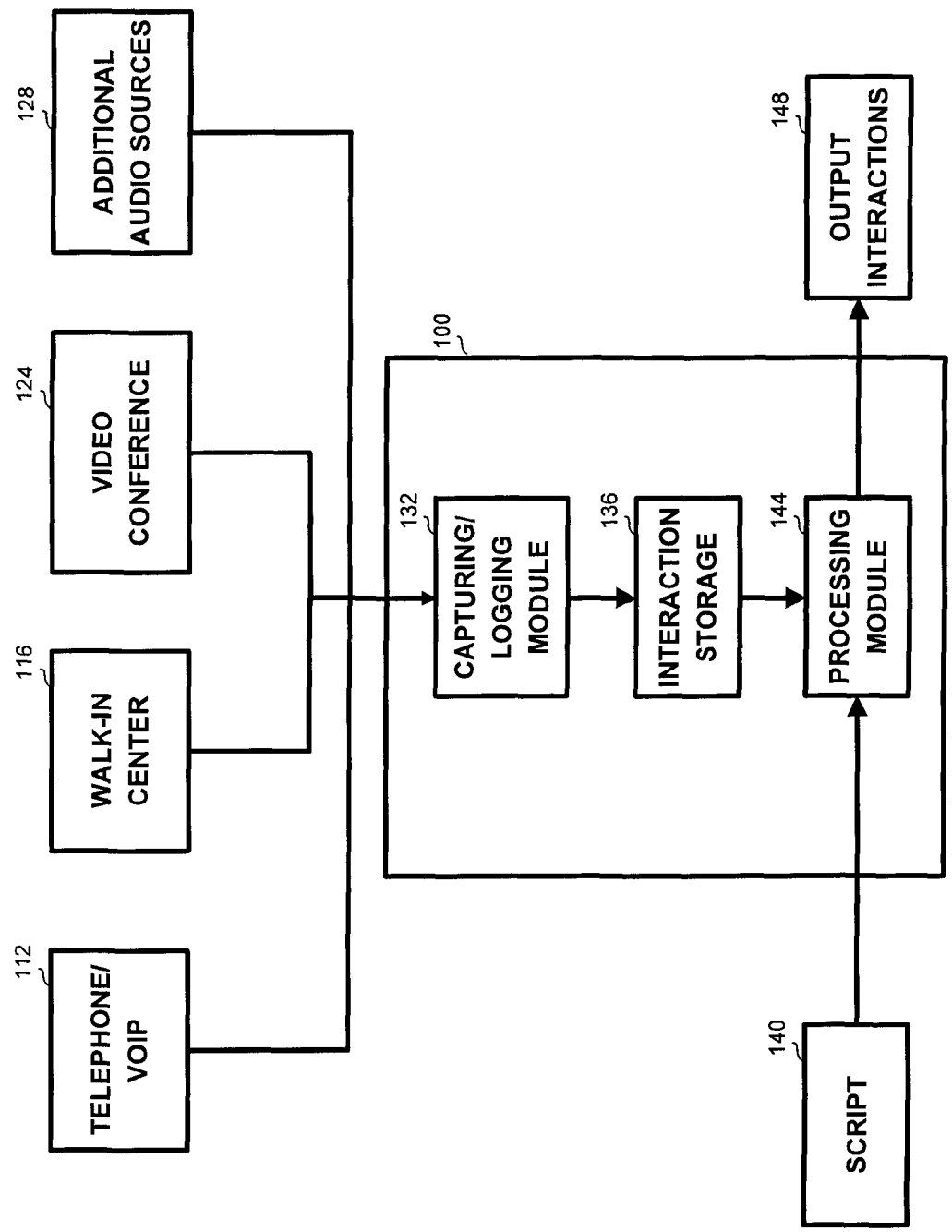
FIG. 1 is a block diagram of a system for capturing and logging interactions and determining whether the interactions comply with a script, in accordance with some exemplary embodiments of the disclosed subject matter.

Referring now to FIG. 1, showing a schematic exemplary block diagram of typical components of system 100 where a method and apparatus according to exemplary embodiments of the disclosed subject matter may be used in a typical environment.

The environment may be an interaction-rich organization, e.g., a contact center, a bank, a trading floor, an insurance company or any applicable financial or other institute. Other environments may include a public safety contact center, an interception center of a law enforcement organization, a service provider, or the like. Interactions captured and processed by system 100 may be any applicable interactions or transmissions, including phone calls, video conferences, interactions with customers or users, or interactions involving organization members, suppliers or other business partners or parties, broadcasts, or the like.

As shown, system 100 may include a capturing and/or logging module or component 132 which may receive input from various sources such as but not limited to telephone/VoIP 112, walk-in center 116, video conference 124, or additional audio sources 128, which may include sources that contain audio as well as other components. It will be understood that capturing and logging module 132 may receive any digital input produced by any component or system, e.g., any recording or capturing device. For example, any one of a microphone, a computer telephony integration (CTI) system, a private branch exchange (PBX), a private automatic branch exchange (PABX), an email server system, a chat server system, a social media capture system, or the like may be used in order to capture audio signals or other data. The captured or logged audio may be of any form or format, and may be produced using various technologies, including trunk side, extension side, summed audio, or separate audio. The audio may also be encoded using various encoding and decoding protocols such as G729, G726, G723.1, or the like. The interactions may be carried over landline, mobile, satellite phone or other technologies.

It will be appreciated that voice messages are optionally captured and processed as well, and that embodiments of the disclosed subject matter are not limited to two-sided conversations. Captured interactions may include face to-face interactions, such as those recorded in a walk-in-center, video conferences that include an audio component. Additional audio sources 128 may include vocal sources such as microphone, intercom, vocal input by external systems, vocal input of social networks, broadcasts, files, streams, or any other source.

Data from all the above-mentioned sources and possibly other sources may be captured and/or logged by capturing/logging module 132. Capturing/logging module 132 may include a computing platform that may execute one or more computer applications, e.g., as detailed below. The captured data may optionally be stored in storage which may comprise one or more mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like.

Interaction storage 136 may be common or separate for different types of captured segments of interactions of other vocal data. The storage may be located onsite where the segments or some of them are captured, or in a remote location. The capturing or the storage components can serve one or more sites of a multi-site organization. Interaction storage device 136 may store data related to the script, indications to which interactions contain the script and its location, or other related data.

System 100 may also receive as input script 140 in text or audio format. If the script is provided as audio, it may undergo automatic or manual speech to text for identifying the textual representation.

System 100 may comprise processing module 144 for searching the script within the captured or logged interactions, and for outputting a list or another collection 148 of interactions containing script 140, possibly with an indication of the location of the script within the interaction, for example 15 second from the beginning of the interaction. Each such interaction in which the script was found may also be associated with a certainty indicator, indicating the probability or degree of certainty that the script was indeed said in the interaction.

In some embodiments, list 148 or another collection may comprise indications to interactions which do not contain the script, although there may have been a need to say the script, for example when an action associated with the script was taken.

System 100 may include one or more computing platforms executing components for carrying out the disclosed steps. System 100 may be or may include a general purpose computer such as a personal computer, a mainframe computer, or any other type of computing platform that may be provisioned with a memory device (not shown), a CPU or microprocessor device, and several I/O ports (not shown).

System 100 may execute or may be implemented as one or more collections of computer instructions, such as libraries, executables, modules, or the like, programmed in any programming language such as C, C++, Java or other programming languages, and/or developed under any development environment, such as .Net, J2EE or others. Alternatively, methods described herein may be implemented as firmware ported for a specific processor such as digital signal processor (DSP) or microcontrollers, or may be implemented as hardware or configurable hardware such as field programmable gate array (FPGA) or application specific integrated circuit (ASIC). The software components may be executed on one platform or on multiple platforms wherein data may be transferred from one computing platform to another via a communication channel, such as the Internet, Intranet, Local area network (LAN), wide area network (WAN), or via a device such as CD-ROM, disk on key, portable disk or others.

Figure 2:
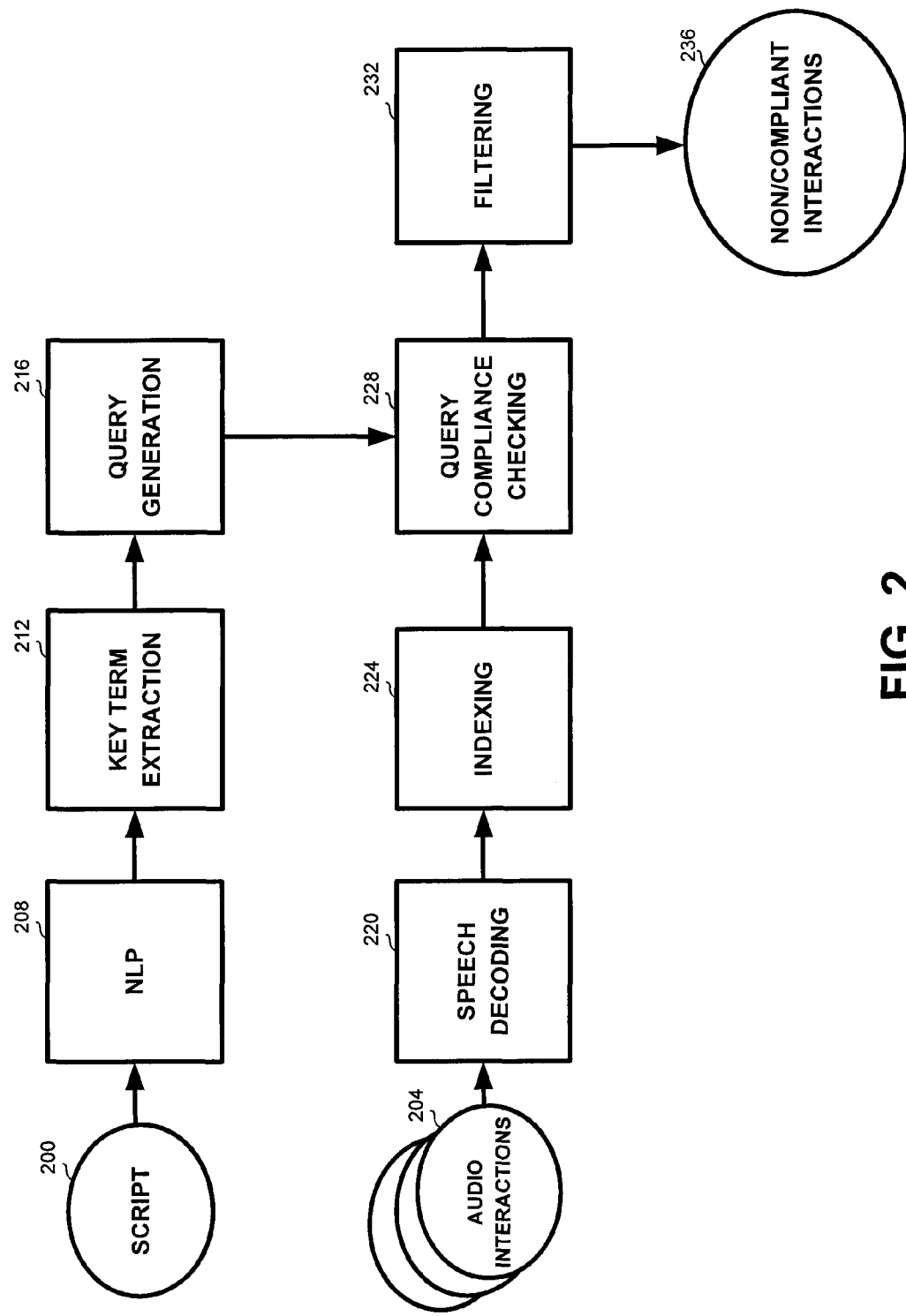
FIG. 2 shows steps in a flowchart of a method for extracting interactions that comply or do not comply with a script, in accordance with some exemplary embodiments of the disclosed subject matter.

Referring now to FIG. 2, showing a flowchart of steps in a method for extracting interactions according to whether they comply with a script, in accordance with some exemplary embodiments of the disclosed subject matter.

The input to the method may comprise a script 200, which may be provided as text. Alternatively, the script may be provided as an audio segment and transformed to text manually or by a speech to text system, as an image from which the script text may be retrieved manually, by OCR, or the like. For example, upon a user calling a call center and requesting to perform a certain action that involves a fee, the handling agent may be required to repeat the following script: "There is a fee of 50$ to process your payment today. Do you consent to this fee?" in order to make sure that the payment is authorized.

Further input to the method may comprise one or more audio interactions 204, for each of which it may be required to determine whether or not a particular script was said by the agent.

On step 208, Natural Language Processing (NLP) may be applied to the textual script. The NLP may comprise any one or more of the following stages: sentence boundary detection, tokenization, part of speech (POS) tagging, lemmatization, shallow parsing such as chunking, and full parsing such as full constituency or dependency parsing for analyzing sentences and creating a tree structure, or others. In the example above, the output of the NLP may be: "There/EX is/VBZ a/DT fee/NN of/IN 50/CD $/NNS to/TO process/VB your/PRP$ payment/NN today/NN./. Do/VBP you/PRP consent/VB to/TO this/DT fee/NN ?/.", wherein the identifier following each word marks the part of speech associated with the word.

On step 212, key terms may be extracted from the parsed text, in order to identify the key terms characterizing the script, or terms which may be most useful in determining whether the script was said in the interaction. Key term extraction step 212 is further detailed in association with FIG. 3 below.

On step 216 a query may be created based upon the key terms extracted on step 212 and additional data from the script. Query generation step 216 is further detailed in association with FIG. 4 below.

Audio calls 204, which may be provided as files, streams, or any other format, may undergo preprocessing, which may include speaker separation, silent parts removal, noise and music removal, removal of audio of insufficient quality, or any other processing or enhancement.

Audio calls 204, whether or not preprocessing was performed, may undergo speech decoding step 220 for decoding the audio into textual elements, such as words, sub-words, phonemes or a hybrid combination thereof.

Decoding step 220 may use any speech recognition engine, such as a phonetic based, word based or hybrid based engines. It will be appreciated that the output of decoding step 220 may depend on the particular engine, and on searching capabilities, as detailed below.

Decoding step 220 may be followed by an indexing step 224 for indexing the textual elements decoded on decoding step 200 for search. The index may thus be a phonetic index based on dictionary of phoneme N-grams (sub-words), a word dictionary, or a hybrid dictionary based on words and sub-words. The index may contain an offset for each word or sub-word indicating the order of the words in the transcription, or the time stamp within the audio when the word was said. The index may be in a form of a lattice, 1-best form, N-best form or others.

On step 228 the query created on step 216 may be applied to any one or more of the indexed interactions, to determine relevance score which may indicate a probability that the script was said in the interaction. The output of step 220 may also comprise a relevance score for the interaction, and optionally a location within the audio in which the script was said, if applicable.

On step 232, the determination results, which may contain the relevance scores for the interactions, may be filtered to output interactions 236 expected to be compliant or non-compliant with the query. For example filtering step 232 may output only interactions having relevance score exceeding a threshold, only interactions which do not contain the script, only interactions having relevance score below a threshold, or the like.

Figure 3:
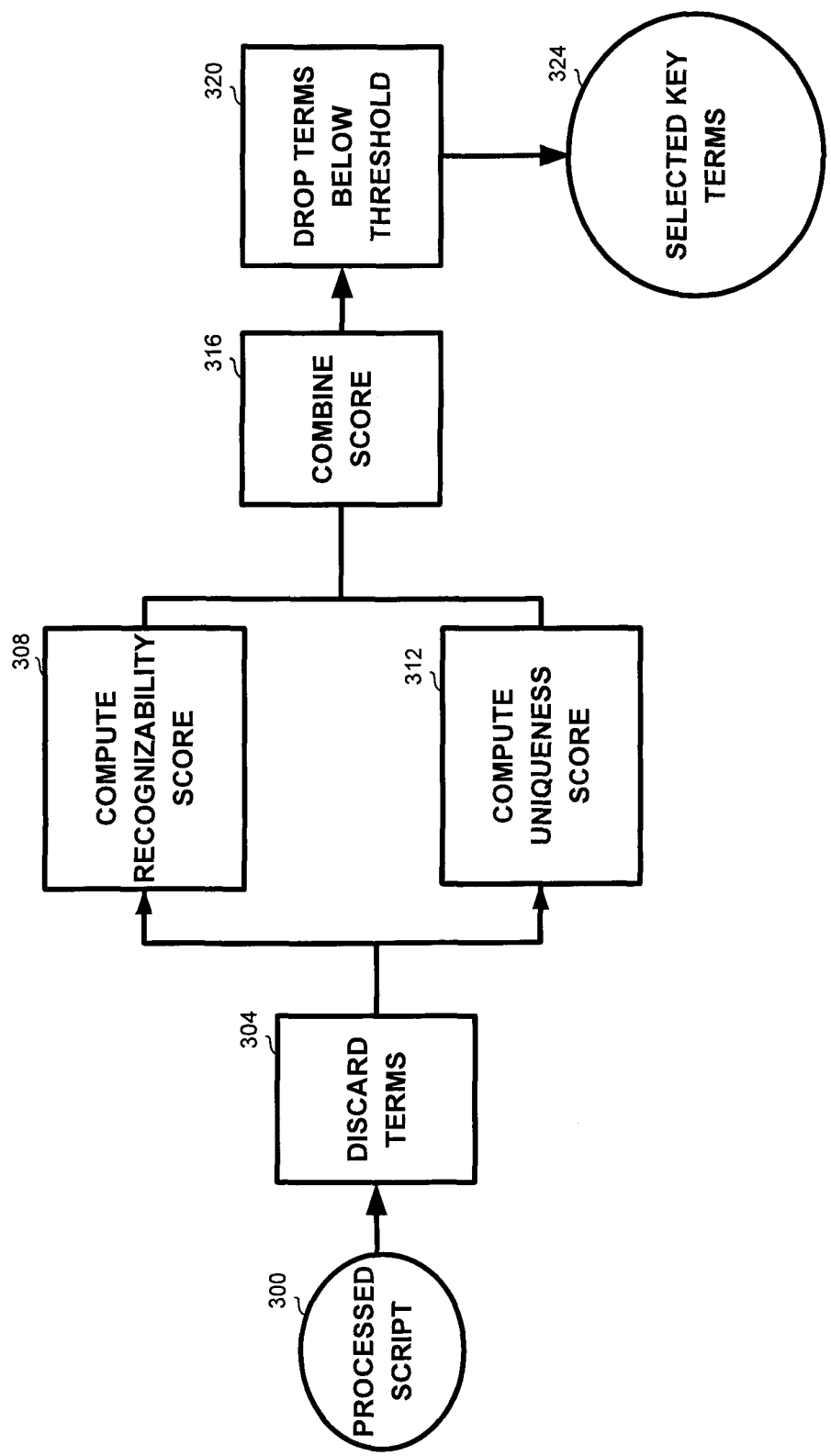
FIG. 3 shows steps in a flowchart of a method for extracting key terms from a script, in accordance with some exemplary embodiments of the disclosed subject matter.

Referring now to FIG. 3, showing steps in a flowchart of a method for extracting key terms from a script, in accordance with some exemplary embodiments of the disclosed subject matter.

The method receives as input a script 300 to be located. The script may be received as text, as audio and be manually transcribed or processed by a speech to text engine, as an image from which the text script is retrieved manually or using OCR, or the like.

On step 304 the script may undergo word discarding for discarding words that are irrelevant or may harm the detection. Such words to be discarded may include words that do not occur in the Automatic Speech Recognition (ASR) language model and may thus not be recognized; stop words, which are very frequent words having little importance such as "a", "the", "for"; numbers, dates, names such as names of persons or of geographical locations, or the like. Only the non-discarded words are provided for further analysis.

On step 308, the recognizability of each word in the words left after discarding step 304 may be determined. The recognizability may be defined as the probability that the word is correctly identified by an ASR engine. Step 308 may be performed by a soft classification model in which an object is assigned a set of probabilities, each designating the probability that the object is associated with one of a collection of classes, or specifically by a soft binary classification model in which an object is assigned a probability of being associated with a class and the complementary probability of not being associated with the class. The classification may be performed by a support vector machine (SVM) incorporated into a probability function, and trained to identify words that are likely to be correctly identified by the engine based on the phonetic features of the word. Once a classifier is trained, as detailed below, each word may be input into the classifier, which may then output a confidence score that the word will be recognized correctly by the corresponding ASR engine. The "recognizability" model may be trained as follows: existing automatic and manual transcriptions of audio calls may be used for preparing a list of words that are correctly recognized with high probability by an ASR engine (positive examples), and another list may be prepared of words that are incorrectly recognized with high probability by an ASR engine (negative examples). Each word in the lists may then be transformed into a vector of phonetic features and fed to a machine learning algorithm, such as an SVM that builds a classification model. For example, the word "payment" has the phonetic representation of "P EY M IH N T". The 1-grams contain the phonetic features of 'P', 'EY', 'M', 'IH', 'N', 'T'; the 2-grams contain the phonetic features of 'P EY', 'EY M', 'M IH', 'IH N', 'N T', and the 3-grams contain the phonetic features of 'P EY M', 'EY M IH', 'M IH N', 'IH N T'. The model may be created using "positive" and "negative" examples, and may be based on the features of words, phonemes, or other speech parts.

The description above may be used for training a model, such that the recognizability of new words, as detailed below, may be identified automatically based on a model created by the training.

The recognizability of each word may then be determined by the recognizability of the phoneme combination. Determining the recognizability may be performed as follows: receiving a representation of a word as a vector of phonetic features; providing the vector as an input to a machine learning classifier, such as SVM; and receiving from the classifier a probability that the word belongs to a certain class. The probability may be determined using the model above, by comparing the features of the word or part thereof to corresponding features in the model.

For example the classifier may output that there is a probability of 0.6 that the word belongs to a positive class and is thus recognizable, and a probability of 0.4 that the word belongs to a negative class and is thus not recognizable. The provided probability may indicate the recognizability of the word. The word may then be determined to be recognizable if the probability of it belonging to a positive class exceeds a predetermined threshold. If the predetermined threshold is 0.5 this would mean that it is more likely that the word is recognizable than not. A threshold higher than 0.5, for example 0.8, implies that higher certainty is required for a word to be determined as recognizable.

On step 312, the uniqueness of each word of the script may be determined, for example by determining the relative frequency of the word within a relevant document collection, such as a collection of transcribed calls, using statistical measures such as Term Frequency-Inverse Document Frequency (TF-IDF), in order to identify words that are less likely to appear anywhere else in the interaction besides the script. It will be appreciated that TF-IDF is just an example for such measure and any other appropriate measure may be used.

TF-IDF is a numerical statistics intended to reflect how important a word is to a document, relatively to its importance in a collection or corpus of documents. In some embodiments, TF-IDF score may be computed as follows:

$$\text{TF-IDF}(w,s) = \text{tf}(w,s) \cdot \text{idf}(w,D)$$

wherein w is a word such as 'payment' in a script s, and D is a collection of interactions.

The term frequency (tf) component of the TF-IDF measure that assesses the importance of the word w in the script s may be determined by:

$$tf(w, s) = \frac{f(w, s)}{\max\{f(t, s); t \in s\}}$$

wherein f(w,s) is the number of occurrences of word w in s. The tf measure equals 1 if a word w is the most frequent word in a script s.

The inverse document frequency (idf) component specifies how common the word w is in a representative collection of interactions is. It is given by:

$$idf(w, D) = \log \frac{|D|}{|\{d \in D: w \in d\}|}$$

wherein |D| is the number of interactions in a collection and |{d∈D:w∈d}| is the number of interactions in the collection that contain the word w. The idf measure equals 0 if a word w occurs in every interaction of the collection (i.e. w is a common word) and increases if w is a rare word.

In order to avoid division by 0, 1 may be added to the expression in the denominator of the idf formula above, providing $$idf(w, D) = \log \frac{|D|}{|\{d \in D: w \in d\}| + 1}$$

The TF-IDF score increases as a word is an important word in the script, but rare in the collection of interactions, thus making it a good key term candidate for a query. A mapping that provides TF-IDF scores for a variety of words may be calculated offline, based on a corpora of manually or automatically transcribed audio calls. For example the word "payment" may be associated with a TF-IDF score of 1.2 in respect to a particular corpus and the script above.

On step 316, the recognizability of the word as determined on step 308 and the uniqueness of the word as determined on step 312 may be combined into a single score, which may indicate how meaningful the recognition of the word is.

The combined score may be determined as the algebraic average between the recognizability score and the uniqueness score, as the geometric average of the scores, or the like.

In some embodiments, only words having a recognizability score and uniqueness score exceeding corresponding predetermined thresholds may be output for further analysis.

However, in some embodiments, the separate scores may not be compared to a threshold, but only the combined score.

On step 320, the terms having scored below the threshold(s) may be discarded. For example, if the recognizability of the word "payment" is 0.8 and its uniqueness is 1.2, the combined score may be 1.0 (algebraic average). If the threshold is set to 0.5, then the word "payment" may be kept, while if the threshold is set to 1.5, the word may be discarded. The key terms having scores exceeding the threshold may be output as selected key terms 324.

Figure 4:
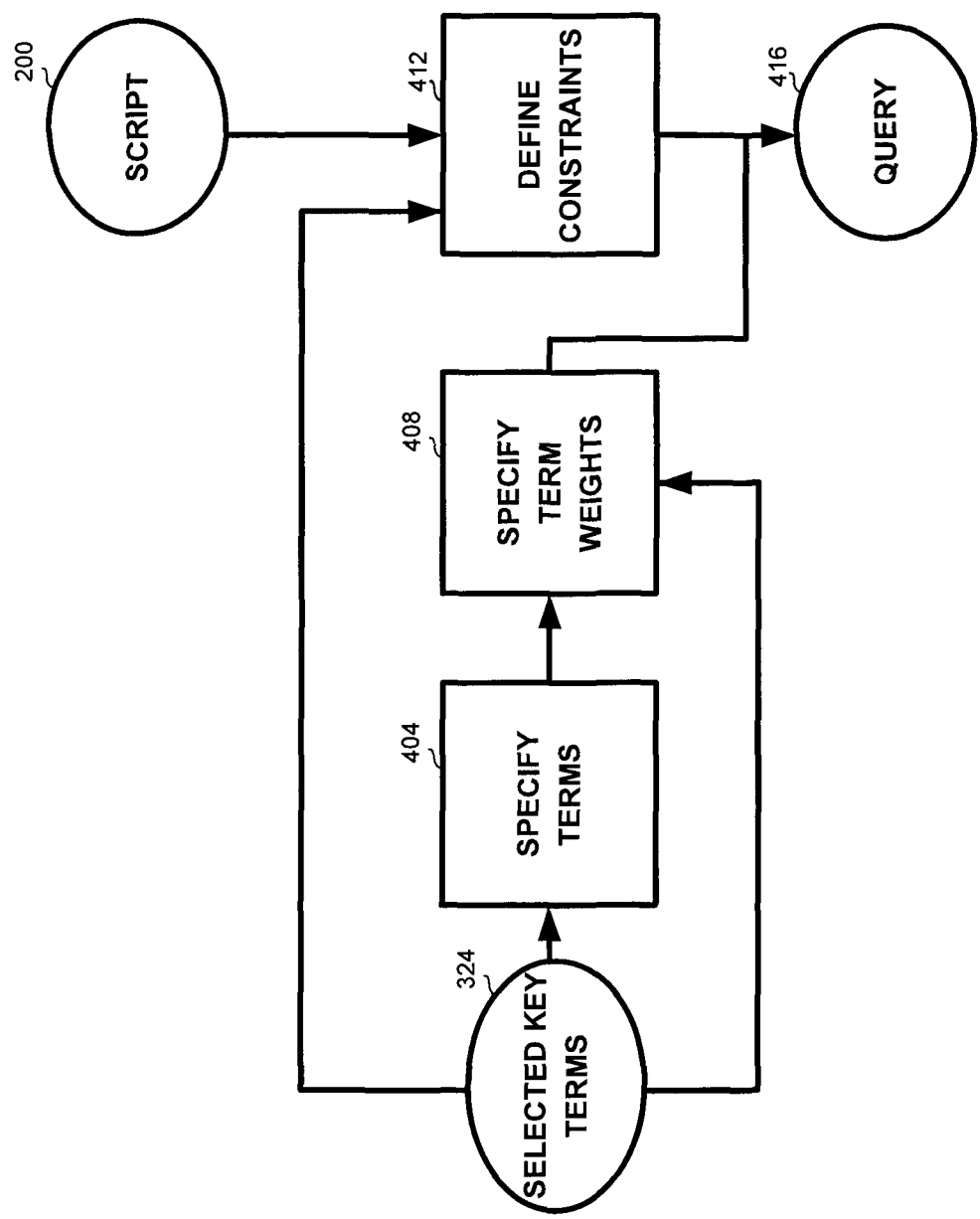
FIG. 4 shows steps in a flowchart of a method for generating a query based upon keywords extracted from a script, in accordance with some exemplary embodiments of the disclosed subject matter.

Referring now to FIG. 4, showing steps in a flowchart of a method for generating a query based upon a script, in accordance with some exemplary embodiments of the disclosed subject matter. It will be appreciated that the query generation is independent of the specific search engine used to search for the query in the text associated with the interactions.

Selected key terms 324, as output for example by the key term extraction method shown on FIG. 3 may be received as input to the method for generating a query. On step 404, certain terms may be specified from the input terms. For example, the input terms may be specified as is, or may be reviewed by a user, who may add, delete or change terms.

On step 408, a weight may be associated with each search term. In some embodiments, the weight of a term may be specified as the combined score determined on step 316 of FIG. 3. The weights may be in any required range such as 0-1, 0-100, or the like. Although all specified terms are extracted from the script, it is not necessarily required that all terms appear in an examined interaction, since due to a word error rate associated with ASR engines, one or more words may be misrecognized. Thus, it may be required that not necessarily each and any word is recognized, but certain words may have higher significance than others. It will be appreciated that generally, recognizing words having higher accumulated weight may increase the certainty that the script is indeed found in the interaction. In the example above, it may be required that the interaction contains the words "process" or "payment" or "consent", wherein the weight of the word "process" is 4, the weight of the word "payment" is 6, and the weight of the word "consent" is 7.

On step 412, constraints may be defined which relate to the order and distance between terms in the script. The distance may be specified in the number of words separating the two terms, a time interval between when the two terms are expected to be said, or a combination thereof. In the example above, it may be required that the word "process" appears at most three words before the word "payment", and that the word "payment" appears at most five words before the word "consent". The distance constraints may be used in order to ensure that all found terms appear in the context of the script, rather than independent words that appear in the interaction by chance. Thus, distance constraints may affect the final relevance score of an interaction.

The term weights and constraints may be combined into query 416. In the example above, the query comprises the combination of the above words, and provides for finding interactions that contain the words: "process", "payment" or "consent", wherein each word has an associated weight. The weight may be based on the combined score described above. In addition, if both words "process" and "payment" appear, then the word "process" should occur within 3 words before "payment", and similarly if both words "payment" and "consent" appear, then the word "payment" should occur within 5 words before "consent".

Referring now to FIG. 5, showing steps in a flowchart of a method for retrieving interactions complying or non-complying with a query, in accordance with some exemplary embodiments of the disclosed subject matter.

The method may receive as input one or more indexed interactions 500, which may be the output by indexing step 224 of FIG. 2. Each indexed interaction may be received as a lattice, 1-best form, N-best form or the like.

The method may also receive query 416 as output by a query generation method, such as the method discussed in association with FIG. 4 above.

On step 504 the key terms may be searched for in each interaction, which may include determining whether each selected term appearing in the query is found in the interaction, and the accumulated weight of the words that do appear in the interaction. The output of step 504 may consist of all interactions that contain at least one selected key term, and for each interaction the accumulated weight of the found words In order to improve the detection accuracy, the N-Best form produced by the ASR engine may be searched. Alternatively, other methodologies may be applied, such as: searching over the full lattice of the interaction; hybrid word and sub-word term detection; or any combination of the above.

Some embodiments of methods for indexing interactions are disclosed in chapter 2 of Ph. D. Thesis by Igor Szoke's titled: "Hybrid word-subword spoken term detection" published on 2010, incorporated herein by reference.

On step 508, it may be determined which of the constraints defined on step 412 of FIG. 4 is complied with by the interaction. Each of the key terms may be searched for within the interaction, and it may be tested for each distance constraint whether the involved words or terms are in the specified order and within the required distance. On step 512, a relevance function may be applied and a value may be determined for the interactions, based on the compliance with the constraints as determined on step 508. The relevance function may take into account the accumulated weights of the found words. The relevance function may also take into account the constraints which are complied with by the interaction. The relevance score for the interaction may be determined in a multiplicity of ways. An exemplary implementation is as follows:

For each interaction a graph may be constructed in which the vertices represent the key terms that were found in the interaction. And there are no edges defined between the vertices.

Then for each distance constraint complied with by the interaction, the vertices representing key terms associated with the constraint are being connected, e.g., by adding a connecting edge. By repeating this for all constraints, the key terms identified in the interaction are divided into groups, such that the terms in each group are connected, but any two groups are disconnected. Thus, each group potentially represents "traces" of the script.

Each group may then be scored by summing up the weights of the key terms comprised in the group. The value of the relevance function of the interaction may then be determined as the score of the group with the highest score.

Alternatively, the relevance function may be a probabilistic function, which may be performed using machine learning for assessing the likelihood of the script to have been said in the interaction.

The interactions may then be sorted in accordance with the value of a relevance function.

It will be appreciated that step 508 and 512 may be performed together, wherein the compliance is determined and the graph is updated for each constraint. Once all constraints are tested, the groups' scores may be determined and the maximum may be selected.

On step 516, the interactions for which the value of the relevance function is above or below a threshold may be selected, depending whether it is required to identify complying or non-complying interactions. If the threshold is predetermined, then sorting the interactions in accordance with the relevance function value may be omitted. If, however, the threshold is relative, for example if it is required to return 10% of the interactions that comply with the script and having the highest scores, then sorting may be performed.

It will be appreciated that sorting may be relevant if it is required to process a given collection of interactions and to determine some of them as complying or non-complying with the script.

The table below provides an example of the time offsets in which the words discussed above are said in four interactions, and the resulting score. As mentioned in association with step 412 of FIG. 4 above, the weight of the word "process" is 4, the weight of the word "payment" is 6, and the weight of the word "consent" is 7.

In addition, if both words "process" and "payment" appear, then the word "process" should occur within 3 words before "payment". Similarly if both words "payment" and "consent" appear, then the word "payment" should occur within 5 words before "consent". The words "process" and "payment" both occur in document 1. The distance constraint between the words holds and therefore the relevance score of document 1 is the sum of weights of these words, which is 10. Document 2 contains only the word "payment" and therefore its score is 6. Document 3 contains two key terms "payment" and "consent". However, since the constraint between the terms is not satisfied, the relevance score is the weight of a term with the highest weight which is 7. Finally, the relevance score of document 4 is the sum of weights of the terms "consent" and "payment", which is 13.

TABLE 1

| Document ID | Process [offset] | Payment [offset] | Consent [offset] | Score |
|---|---|---|---|---|
| 1 | 120 | 122 | — | 10 |
| 2 | — | 130 | — | 6 |
| 3 | — | 120 | 110 | 7 |
| 4 | — | 130 | 135 | 13 |

The documents order, after being sorted by the score is 4, 1, 3 and 2. If the threshold is set to 8, then documents 2 and 3 may be dropped on step 516, resulting in documents 4 and 1 complying with the script and documents 2 and 3 not complying with the script.

Referring now to FIG. 6, showing a block diagram of the components in an apparatus for identifying interactions complying or non-complying with a query, in accordance with some exemplary embodiments of the disclosed subject matter.

In some exemplary embodiments, apparatus 600, which may be an implementation of processing module 144, may be executed by a computing device capable of executing applications, such as a server computing device, a client computing device, a mobile computing device such as a laptop, a tablet computer or the like.

Apparatus 600 may comprise one or more processor(s) 604. Processor 604 may be a Central Processing Unit (CPU), a microprocessor, an electronic circuit, an Integrated Circuit (IC) or the like. Processor 604 may be utilized to perform computations required by the apparatus 600 or any of it subcomponents.

In some exemplary embodiments of the disclosed subject matter, apparatus 600 may comprise an Input/Output (I/O) device 608 such as a display, a pointing device, a keyboard, a touch screen, or the like. I/O device 608 may be utilized to receive input from a user and to provide output to the user.

In some exemplary embodiments, apparatus 600 may comprise a storage device 612. Storage device 612 may be a hard disk drive, a Flash disk, a Random Access Memory (RAM), a memory chip, or the like. In some exemplary embodiments, storage device 612 may retain program code operative to cause the processor 604 to perform acts associated with any of the subcomponents of apparatus 600. The components detailed below may be implemented as one or more sets of interrelated computer instructions, executed for example by processor 604 or by another processor. The components may be arranged as one or more executable files, dynamic libraries, static libraries, methods, functions, services, or the like, programmed in any programming language and under any computing environment.

Storage device 612 may comprise NLP module 616 for parsing and processing a text script, comprising for example retrieving the basic form of the script words, dropping stop words, or the like.

Storage device 612 may comprise key term extraction module 620 for extracting key terms from the processed text, as detailed in association with FIG. 3 above. The key terms may be extracted based on their recognizability or uniqueness.

Storage device 612 may comprise query generator 624 for generating a query based on the extracted key terms, as detailed in association with FIG. 4 above.

Storage device 612 may comprise speech decoding module 628 for decoding one or more captured interactions into textual elements, such as words, sub-words, phonemes or a hybrid combination thereof.

Storage device 612 may comprise indexing module 632 for indexing the textual elements for search. The index may be a phonetic index based on dictionary of phoneme n-grams (sub-words), a word dictionary, or a hybrid dictionary based on words and sub-words. Indexing may comprise associating an offset with each word or sub-word indicating the order of the words in the transcription, or the time stamp within the audio when the word was said. The index may be in a form of a lattice, 1-best form, N-best form or others.

Speech decoding module 628 and indexing module 632 may be implemented together by any speech recognition engine, such as a proprietary engine, a third party engine, or the like.

Storage device 612 may comprise query compliance determination module 636 for applying the query generated by query generator 624 to the indexed interaction, and determining whether, or to what certainty degree the interaction complies with the query, which indicates a degree of certainty that the interaction contains the script.

Storage device 612 may comprise filtering module 640 for filtering interactions that comply or not comply with the query, or interactions that comply to at most or at least certain degree with the query, in accordance with the specific requirements or application.

Storage device 612 may comprise data and control flow module 644 for managing the control flow and data transfer between the different modules, activating the required modules, fetching input, storing output, or the like.

Storage device 612 may comprise communication modules 648 for communicating with external devices or systems, such as databases or storage devices, capturing modules, engines executed by other computing platforms, or the like.

Storage device 612 may comprise user interface 652 for a user to enter input to the system, for example accepting, rejecting or changing extracted key terms, changing query constraints, or the like, and for receiving the results, for example viewing a list of interactions complying or not complying with the script, if an interaction is complying where in the interaction the script is found or the like. User interface 652 may further enable a user to skip directly to the location in the interaction in which the script is found, in order to listen to the script.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computerized method for determining compliance of audio interactions with a script, the method comprising:
    using a processor, receiving at least one audio interaction;
    decoding speech within the at least one audio interaction;
    indexing the decoded speech so as to obtain at least one indexed audio interaction;
    receiving a text representing a script;
    automatically extracting at least two key terms from the script, comprising:
    discarding irrelevant terms;
    determining a recognizability score for a word in the script based on a recognizability of a phoneme combination in the word;
    determining a uniqueness score for the word in the script;
    combining the recognizability score and the uniqueness score into a word score; and
    determining that the word is a key term, subject to the word score exceeding a threshold;
    automatically generating a query representing the script, comprising:
    receiving at least one constraint related to a number of words difference between two key terms of the at least two key terms;
    determining spotted key terms of die at least two key terms that appear in the at least one indexed audio interaction;
    determining at least one complied constraint from the at least one received constraint; and
    determining a relevance score for the at least one indexed audio interaction, based on the spotted key terms and the at least one complied constraint; and
    using the relevance score to determine compliance of the at least one audio interaction with the script.

2. The method of claim 1, wherein the at least one indexed audio interaction comprises a multiplicity of indexed audio interactions, and further comprising filtering indexed audio interactions based on the relevance score.

3. The method of claim 2 further comprising: sorting the multiplicity of indexed audio interactions based on the relevance score, and filtering from the multiplicity of indexed audio interactions those interactions having the highest or lowest relevance scores.

4. The method of claim 1, wherein the query comprises a weight associated with at least one of the at least two key terms.

5. The method of claim 4, wherein determining the relevance score comprises:
    determining at least one group of key terms, wherein a key term in the at least one group appears in the at least one interaction, and the key term is connected to another key term in the at least one group if the key term and the other key term appear in one constraint complied with by the interaction;
    determining a score for the at least one group as a function of weights associated with key terms that belong to the at least one group; and
    determining the relevance score as a maximal relevance score associated with any group of the at least one group.

6. The method of claim 1, wherein the at least one constraint refers to order and distance between the at least two key terms, wherein the distance relates to time difference between the at least two key terms.

7. The method of claim 1, wherein the uniqueness score is determined using a Term Frequency-Inverse Document Frequency (TF-IDF) algorithm.

8. The method of claim 1, wherein
    determining that the word is a key term comprises determining that the recognizability score exceeds a first threshold, or the uniqueness score exceeds a second threshold.

9. The method of claim 1, wherein combining the recognizability score and the uniqueness score into a word score is determined as the algebraic average or geometric average of the scores.

10. The method according to claim 1, further comprising sending a list of the at least one audio interactions that do not comply with the script to a user interface.

11. A computerized apparatus having a processor, the processor being adapted to perform steps comprising:
    receiving at least one audio interaction;
    decoding speech within the at least one audio interaction;
    indexing the decoded speech so as to obtain at least one indexed audio interaction;
    receiving a text representing a script;
    automatically extracting at least two key terms from the script, comprising:
    discarding irrelevant terms;
    determining a recognizability score for a word in the script based on a recognizability of a phoneme combination in the word;
    determining a uniqueness score for the word in the script;
    combining the recognizability score and the uniqueness score into a word score; and
    determining that the word is a key term, subject to the word score exceeding a threshold;
    automatically generating a query representing the script, comprising:
    receiving at least one constraint related to a number of words difference between two key terms of the at least two key terms;
    determining spotted key terms of the at least two key terms that appear in the at least one indexed audio interaction;
    determining at least one complied constraint from the at least one received constraint; and
    determining a relevance score for the at least one indexed audio interaction, based on the spotted key terms and the at least one complied constraint; and
    using the relevance score to determine compliance of the at least one audio interaction with the script.

12. The computerized apparatus of claim 11, wherein the at least one indexed audio interaction comprises a multiplicity of indexed audio interactions, and further comprising filtering indexed audio interactions based on the relevance score.

13. The computerized apparatus of claim 12, wherein the processor is further adapted to perform the steps of:
    sorting the multiplicity of indexed audio interactions based on the relevance score, and
    filtering from the multiplicity of indexed audio interactions those interactions having the highest or lowest relevance scores.

14. The computerized apparatus of claim 11, wherein the at least one constraint refers to order and distance between the at least two key terms, wherein the distance relates to time difference between the at least two key terms.

15. The computerized apparatus of claim 11, the relevance score is determined by:
  determining at least one group of key terms, wherein a key term in the at least one group appears in the at least one interaction, and the key term is connected to another key term in the at least one group if the key term and the other key term appear in one constraint complied with by the interaction;
  determining a score for the at least one group as a function of weights associated with key terms that belong to the at least one group; and
  determining the relevance score as a maximal relevance score associated with any group of the at least one group.

16. The computerized apparatus of claim 11, wherein
  determining that the word is a key term comprises determining that the recognizability score exceeds a first threshold, or the uniqueness score exceeds a second threshold.

17. The computerized apparatus of claim 11, wherein the processor is further adapted to perform a step comprising:
  filtering the at least one indexed audio interactions for which the relevance score is above or below a predetermined value.

18. The computerized apparatus of claim 11, wherein combining the recognizability score and the uniqueness score into a word score is determined as the algebraic average or geometric average of the scores.

19. The computerized apparatus of claim 11, wherein the processor is further adapted to perform steps comprising sending a list of the at least one audio interactions that do not comply with the script to a user interface.

20. A computer program product comprising a non-transitory computer readable storage medium retaining program instructions, which program instructions when read by a processor, cause the processor to perform a method comprising:
  receiving at least one audio interaction;
  decoding speech within the at least one audio interaction;
  indexing the decoded speech so as to obtain at least one indexed audio interaction;
  receiving a text representing a script;
  automatically extracting at least two key terms from the script, comprising:
    discarding irrelevant terms;
    determining a recognizability score for a word in the script based on a recognizability of a phoneme combination in the word;
    determining a uniqueness score for the word in the script;
    combining the recognizability score and the uniqueness score into a word score; and
    determining that the word is a key term, subject to the word score exceeding a threshold;
  automatically generating a query representing the script, comprising:
    receiving at least one constraint related to a number of words difference between two key terms of the at least two key terms;
    determining spotted key terms of the at least two key terms that appear in the at least one indexed audio interaction;
    determining at least one complied constraint from the at least one received constraint; and
    determining a relevance score for the at least one indexed audio interaction, based on the spotted key terms and the at least one complied constraint; and
  using the relevance score to determine compliance of the at least one audio interaction with the script.

* * * * *